(12) United States Patent
Huang et al.

(10) Patent No.: US 9,722,818 B2
(45) Date of Patent: Aug. 1, 2017

(54) DECISION FEEDBACK EQUALIZER SUMMATION CIRCUIT

(71) Applicants: Ming-Chieh Huang, San Jose, CA (US); Chan-Hong Chern, Palo Alto, CA (US); Tao Wen Chung, San Jose, CA (US); Yuwen Swei, Fremont, CA (US); Chih-Chang Lin, San Jose, CA (US); Tsung-Ching Huang, San Jose, CA (US)

(72) Inventors: Ming-Chieh Huang, San Jose, CA (US); Chan-Hong Chern, Palo Alto, CA (US); Tao Wen Chung, San Jose, CA (US); Yuwen Swei, Fremont, CA (US); Chih-Chang Lin, San Jose, CA (US); Tsung-Ching Huang, San Jose, CA (US)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 73 days.

(21) Appl. No.: 14/492,237

(22) Filed: Sep. 22, 2014

(65) Prior Publication Data
US 2016/0087817 A1    Mar. 24, 2016

Related U.S. Application Data

(63) Continuation of application No. 13/528,877, filed on Jun. 21, 2012, now Pat. No. 8,862,951.

(51) Int. Cl.
*H03H 7/30*  (2006.01)
*H03H 7/40*  (2006.01)
(Continued)

(52) U.S. Cl.
CPC ........ *H04L 25/03057* (2013.01); *H04L 25/06* (2013.01); *H04L 25/08* (2013.01)

(58) Field of Classification Search
None
See application file for complete search history.

(56) References Cited

U.S. PATENT DOCUMENTS 4,019,118 A * 4/1977 Harwood ............... H03B 19/14
                                                          327/119
5,774,003 A   6/1998 Qureshi et al.
(Continued)

FOREIGN PATENT DOCUMENTS

DE        2161523 B2 * 2/1977 ............... H03F 3/22

OTHER PUBLICATIONS

Bulzcchelli, J.F., et al., "A 10-Gb/s 5-Tap DFE/4-Tap FFE Transceiver in 90-nm CMOS Technology", IEEE Journal of Solid-State Circuits, Dec. 2006, 41(12):2885-2900.
(Continued)

*Primary Examiner* — Wednel Cadeau
(74) *Attorney, Agent, or Firm* — Duane Morris LLP

(57) ABSTRACT

A circuit includes a summation circuit for receiving an input data signal and a feedback signal including a previous data bit. The summation circuit is configured to output a conditioned input data signal to a clock and data recovery circuit. A first flip-flop is coupled to an output of the summation circuit and is configured to receive a first set of bits of the conditioned input data signal and a first clock signal having a frequency that is less than a frequency at which the input data signal is received by the first summation circuit. A second flip-flop is coupled to the output of the summation circuit and is configured to receive a second set of bits of the conditioned input data signal and a second clock signal having a frequency that is less than the frequency at which
(Continued)

the input data signal is received by the first summation circuit.

18 Claims, 6 Drawing Sheets

(51) Int. Cl.
    *H03K 5/159*     (2006.01)
    *H04L 25/03*     (2006.01)
    *H04L 25/06*     (2006.01)
    *H04L 25/08*     (2006.01)

(56) References Cited

U.S. PATENT DOCUMENTS

| | | | |
|---|---|---|---|
| 6,684,074 B1 | 1/2004 | Hong et al. | |
| 7,106,099 B1 | 9/2006 | Nix | |
| 7,358,782 B2 | 4/2008 | Khanoyan et al. | |
| 7,403,760 B1* | 7/2008 | Gao | H03D 3/008 455/312 |
| 8,537,886 B1* | 9/2013 | Su | H04L 25/03038 375/233 |
| 8,637,886 B2* | 1/2014 | Tsuji | H01L 33/44 257/100 |
| 2004/0239373 A1* | 12/2004 | Seshita | H01S 5/042 327/65 |
| 2005/0110550 A1* | 5/2005 | Shi | H03D 3/008 327/307 |
| 2008/0112507 A1 | 5/2008 | Smith et al. | |
| 2008/0159380 A1 | 7/2008 | Kris | |
| 2008/0187036 A1 | 8/2008 | Park et al. | |
| 2012/0128055 A1 | 5/2012 | Jiang | |

OTHER PUBLICATIONS

Ren, J, et al., "Performance Analysis of Edge-based DFE", 2006 IEEE Electrical Performance of Electronic Packaging, pp. 265-268.

Shoval, A., et al., "Comparison of DC Offset Effects in Four LMS Adaptive Algorithms", IEEE Transactions on Circuits and Systems—II: Analog and Digital Signal Processing, Mar. 1995, 42(3):176-185.

* cited by examiner

… (1)

DECISION FEEDBACK EQUALIZER SUMMATION CIRCUIT

CROSS-REFERENCE TO RELATED APPLICATIONS

This application is a continuation of and claims priority to U.S. patent application Ser. No. 13528,877, filed Jun. 21, 2012, now U.S. patent Ser. No. 8862,951, the entirety of which is incorporated by reference herein.

FIELD OF DISCLOSURE

The disclosed systems and methods relate to receiving devices. More particularly, the disclosed systems and methods relate to a decision feedback equalizer and signal processing method for receiving devices.

BACKGROUND

Receiving channels include various circuit components for extracting data received from a transmitter via a transmission line. The transmission line can be a fiber-based transmission line, wire-based line, or wireless transmission line. A decision feedback equalizer ("DFE") is a typical component in a signal processing channel and is used to equalize the frequency response without amplifying noise. Conventional DFEs include a large number of components and are susceptible to noise.

DETAILED DESCRIPTION

This description of the exemplary embodiments is intended to be read in connection with the accompanying drawings, which are to be considered part of the entire written description.

The disclosed circuits and methods advantageously reduce the number of components of a decision feedback amplifier of a receiving processing channel. Additionally, the disclosed circuits and methods output received data bits from the decision feedback amplifier to a clock and data recovery circuit, which improves the performance of the clock and data recovery circuit.

Figure 1:
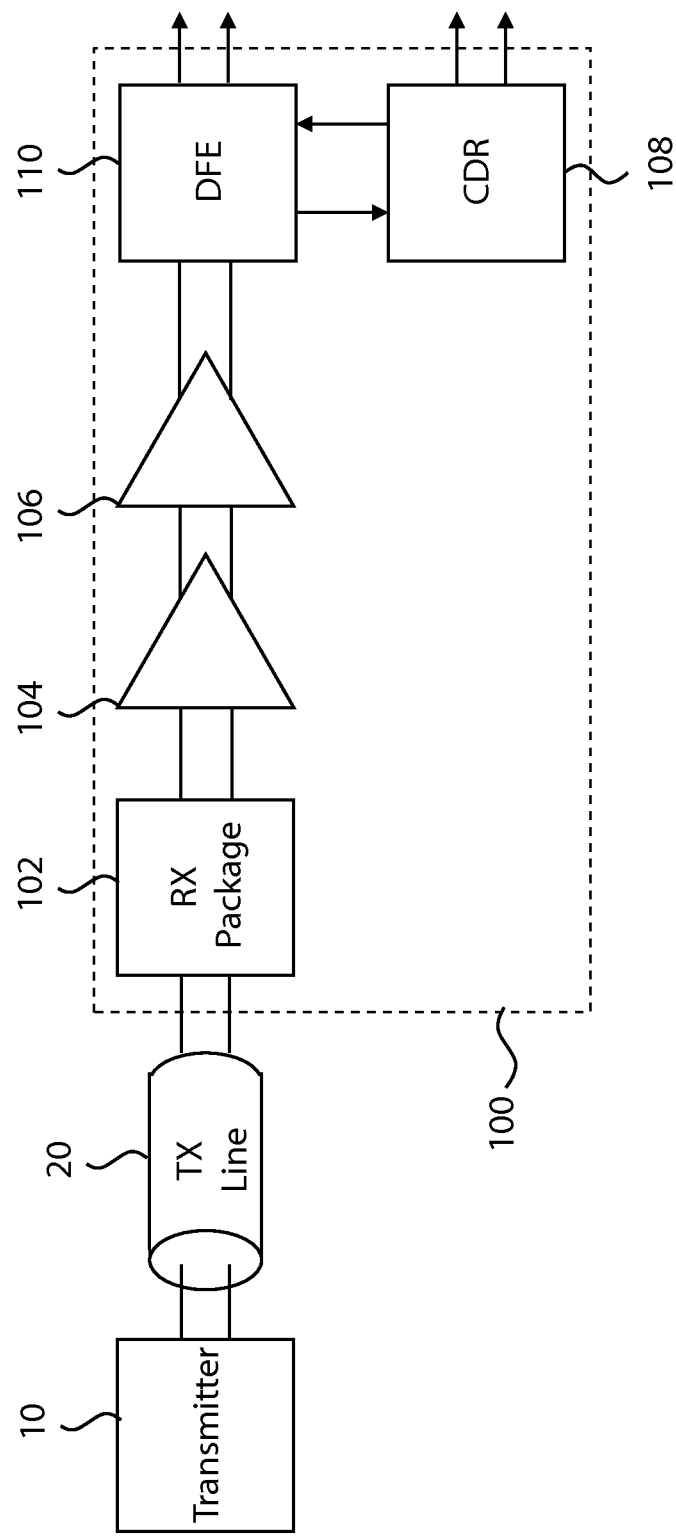
FIG. 1 is a block diagram of one example of a receiving channel in accordance with some embodiments.

FIG. 1 illustrates a signal processing channel 100 that receives signals from a transmitter 10 via transmission ("TX") line 20. In some embodiments, signal processing channel 100 includes receiver ("RX") package 102 that provides a physical interface between TX line 20 and extracts one or more data signals. RX package 102 outputs the extracted signals to an equalizer 104, which outputs signals to a programmable gain amplifier ("PGA") 106. PGA 106 outputs signals to a clock and data recovery ("CDR") block 108 and to a decision feedback equalizer ("DFE") 110. As shown in FIG. 1, DFE 110 also provides a data signal, DATA, to CDR 108 and receives the recovered clock signal, CLK, from CDR 108.

Figure 2:
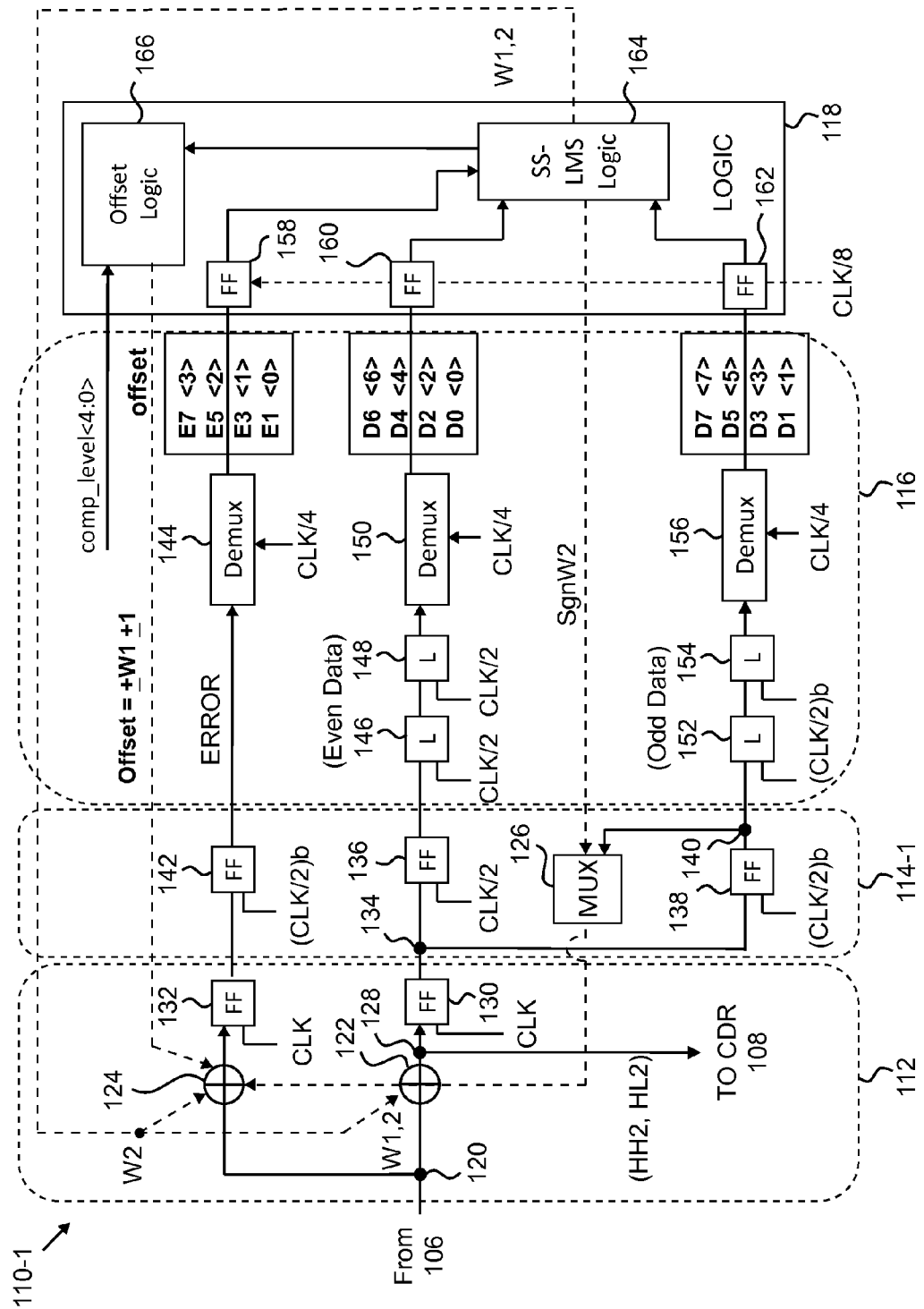
FIG. 2 is a block diagram of one example of a decision feedback equalizer in accordance with the receiving channel illustrated in FIG. 1.

FIG. 2 illustrates one example of a DFE 110-1 in accordance with the signal processing channel illustrated in FIG. 1. As shown in FIG. 2, DFE 110-1 includes three stages 112, 114, and 116 and a DFE logic block 118. Each of the three stages 112, 114-1, and 116 operates at a different clock speed as described in greater detail below.

The first stage 112 receives an input data signal, which can be a differential input signal, from PGA 106 at node 120. In some embodiments, the input data signal has a frequency of 8 GHz, although input data signal may have higher or lower frequencies. Node 120 is coupled to a first summation block 122 and to a second summation block 124. Summation block 122 includes a second input, which is in addition to the input coupled to node 120, coupled to an output of mux 126 and a third input that receives a weighting feedback signal from logic block 118. The output of summation block 122 is coupled to node 128. Node 128 is coupled to an input of flip-flop ("FF") 130, which receives clock signal CLK, and to CDR 108. Summation block 124 receives a weighting feedback signal and an offset feedback signal from logic block 118. Another input of summation block 124 is coupled to mux 126, and an output of summation block 124 is coupled to an input of FF 132. FF 130 receives clock signal CLK.

FFs 130 and 132 output respective signals to second timing stage 114-1. In particular, FF 130 outputs a signal to node 134, which is coupled to FFs 136 and 138 of data splitting stage 114-1. FFs 136 and 138 respectively receive a clock signal operating at a fraction of CLK, i.e., CLK2 and b(CLK2), respectively, such that FFs 136 and 138 are alternately switching as described in greater detail below. FF 138 has its output coupled to node 140, which is coupled to an input of mux 126 and to third timing stage 116. Mux 126 has another input at which it receives a weighting signal from logic block 118. FF 136 has its output coupled to third timing stage 116. FF 132 has its output coupled to an input of FF 142, which receives the fractional clock signal, e.g., (CLK2)b. The output of FF 142 is coupled to third stage 116, which is a signal resolution improvement stage.

The signal output from FF 142 is an error signal, ERROR, which is received at demultiplexer ("demux") 144. Demux 144 receives a clock signal operating at CLK4 and outputs an error value, E1, E3, E5, E7 to logic block 118. FF 136 outputs a data signal, e.g., even data bits, to an latch ("L") 146, which has its output coupled to an input of latch 148. Latches 146, 148 receive a clock signal having a reduced frequency, i.e., CLK2. The output of latch 148 is coupled to an input of demux 150, which receives a clock signal operating at CLK4. Demux 150 outputs even data bits, e.g., D0, D2, D4, D6, etc., to logic block 118.

Node 140 is coupled to an input of latch 152, which has its output coupled to an input of latch 154. Latches 152, 154 receive a clock signal having a reduced frequency, i.e., (CLK2)b. The output of latch 156 is coupled to demux 156, which receives a clock signal operating at CLK4. Demux 156 outputs odd data bits, e.g., D1, D3, D5, D7, etc., to logic block 118.

Logic block 118 includes FFs 158, 160, and 162 which respectively receive an error signal from demux 144, even data bits from demux 150, and odd data bits from demux 156. FFs 158, 160, and 162 each receive a clock signal operating at the reduced clock frequency of CLK8 and have a respective output coupled to SS-LMS (sign-sign least mean squares) logic block 164. SS-LMS logic block 164 outputs weighting values, e.g., W1, W2, etc., to offset logic block 166 and to summation circuits 122 and 124. Offset logic block 166 receives the signals from SS-LMS logic block and a level comparison signals, comp_level<4:0>, and generates an offset signal, which is output to summation circuit 124. Level comparison signals are generated externally of DFE 100-1 and are set to expected signal levels, e.g., 00001=25 mV, 00010=50 mV, 00011=75 mV, etc. If signals after summation circuit 124 are not equal to an expected signal level, then DFE logic 118 continues to update weights until the signals converge.

Figure 3:
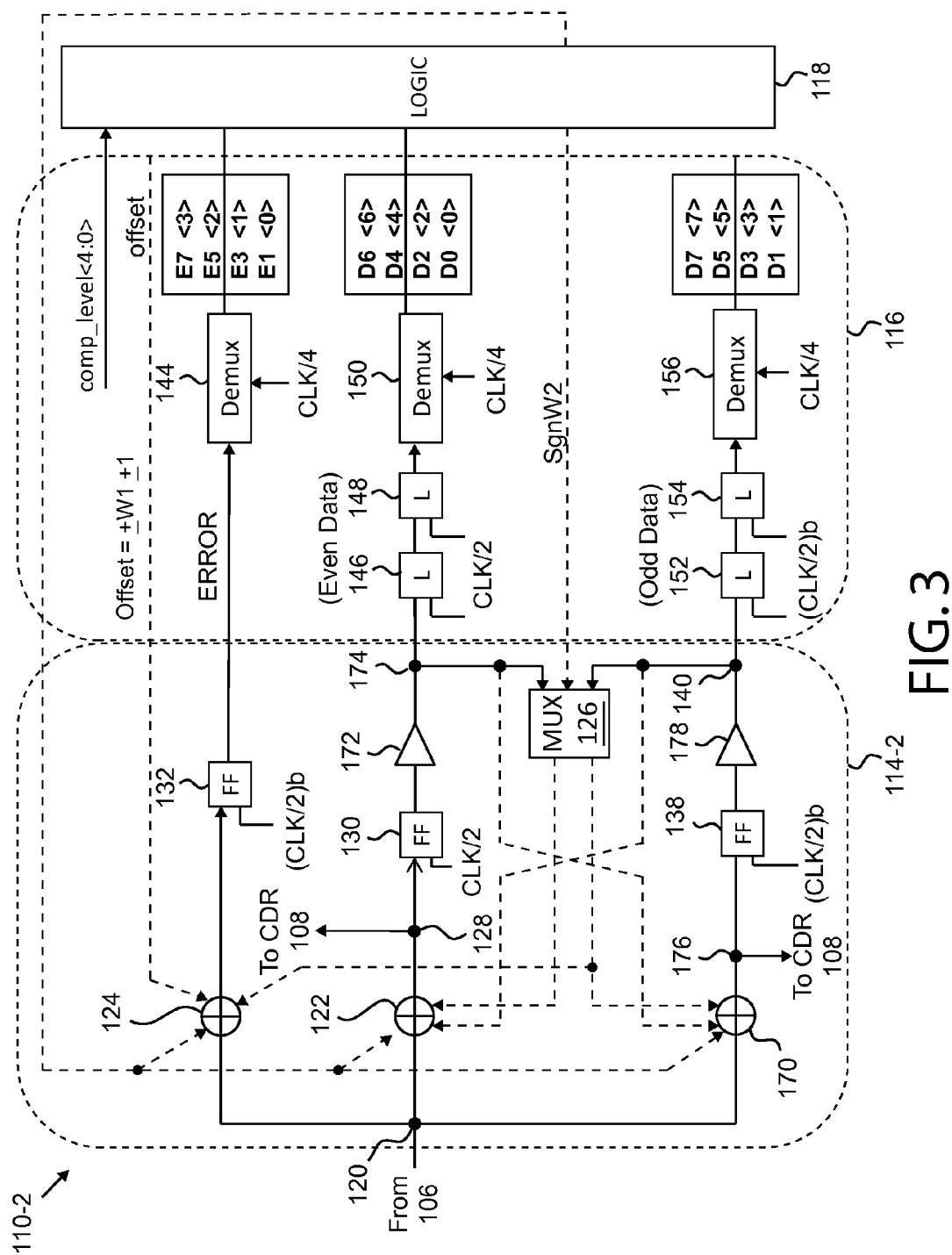
FIG. 3 is a block diagram of another embodiment of a decision feedback equalizer circuit in accordance with the receiving channel illustrated in FIG. 1.

FIG. 3 illustrates another example of a DFE 110-2 in accordance with the signal processing channel 100 illustrated in FIG. 1. As shown in FIG. 3, DFE 110-2 includes stages 114-2 and 116 and logic block 118. Stage 114-2 operates at frequency that is half the rate of clock signal CLK, i.e., at CLK2, and includes an input node 120 that receives a signal from PGA 106.

Input node 120 is coupled to a respective inputs of summation circuits 122, 124, and 170. Summation circuit 122 also includes inputs to receive a weighting feedback signal from logic block 118, a first timing signal from mux 126, and a second timing signal from node 140, which is coupled to an input of mux 126. The output of summation circuit 122 is coupled to node 128. Node 128 is coupled to an input of FF 130 and to CDR 108. FF 130 receives the signal output from summation circuit 122 and a clock signal operating at CLK2. The output of FF 130 is received at an input of buffer 172, which has its output coupled to node 174. Node 174 is coupled to stage 116, to an input of mux 126, and to summation circuit 170.

Summation circuit 124 receives a weighting feedback signal from logic block 118, an offset signal from logic block 118, and a timing signal from mux 126. The output of summation circuit 124 is coupled to an input of FF 132, which receives a clock signal operating at (CLK2)b. The output of FF 132 is an error signal, ERROR, that is output to stage 116.

Summation circuit 170 receives a weighting feedback signal from logic block 118, a first timing signal from node 174, and a second timing signal from mux 126. The output of summation circuit 170 is coupled to node 176, which is coupled to CDR 108 and to an input of FF 130. FF 130 receives a clock signal operating at (CLK2)b and outputs a signal to buffer 178. Buffer 178 has an output coupled to node 140, which is coupled to stage 116, to an input of mux 126, and to an input of summation circuit 122.

Stage 116 includes a demultiplexer 144, which receives the error signal, ERROR, from FF 132 and a clock signal operating at CLK4. Demux 144 outputs an error signal to logic block 118 in response to the error signal and clock signal. Latch 146 is disposed parallel to demux 144 and includes an input coupled to node 174. Latch 146 receives a clock signal operating at CLK2 and outputs a data signal to latch 148, which also receives a clock signal operating at CLK2. The output of latch 148 is coupled to an input of demux 150 that receives a clock signal operating at CLK4 and outputs a data signal, which corresponds to an even data bit of a multi-bit data signal, to logic block 118.

Latch 152 has an input coupled to node 140 and receives a clock signal operating at (CLK2)b. The output of latch 152 is coupled to an input of latch 154, which receives a clock signal operating at (CLK2)b and outputs a data signal to demux 156. Demux 156 outputs an odd data bit to logic block 118.

As described above with respect to FIG. 1, logic block 118 includes FFs, an SS-LMS block, and an offset logic block. Logic block 118 outputs weighting and offset signals in response to receiving the error signals from demux 144, data bits from demuxes 150 and 152, and a level comparison signals, comp_level<4:0>.

Figure 4A:
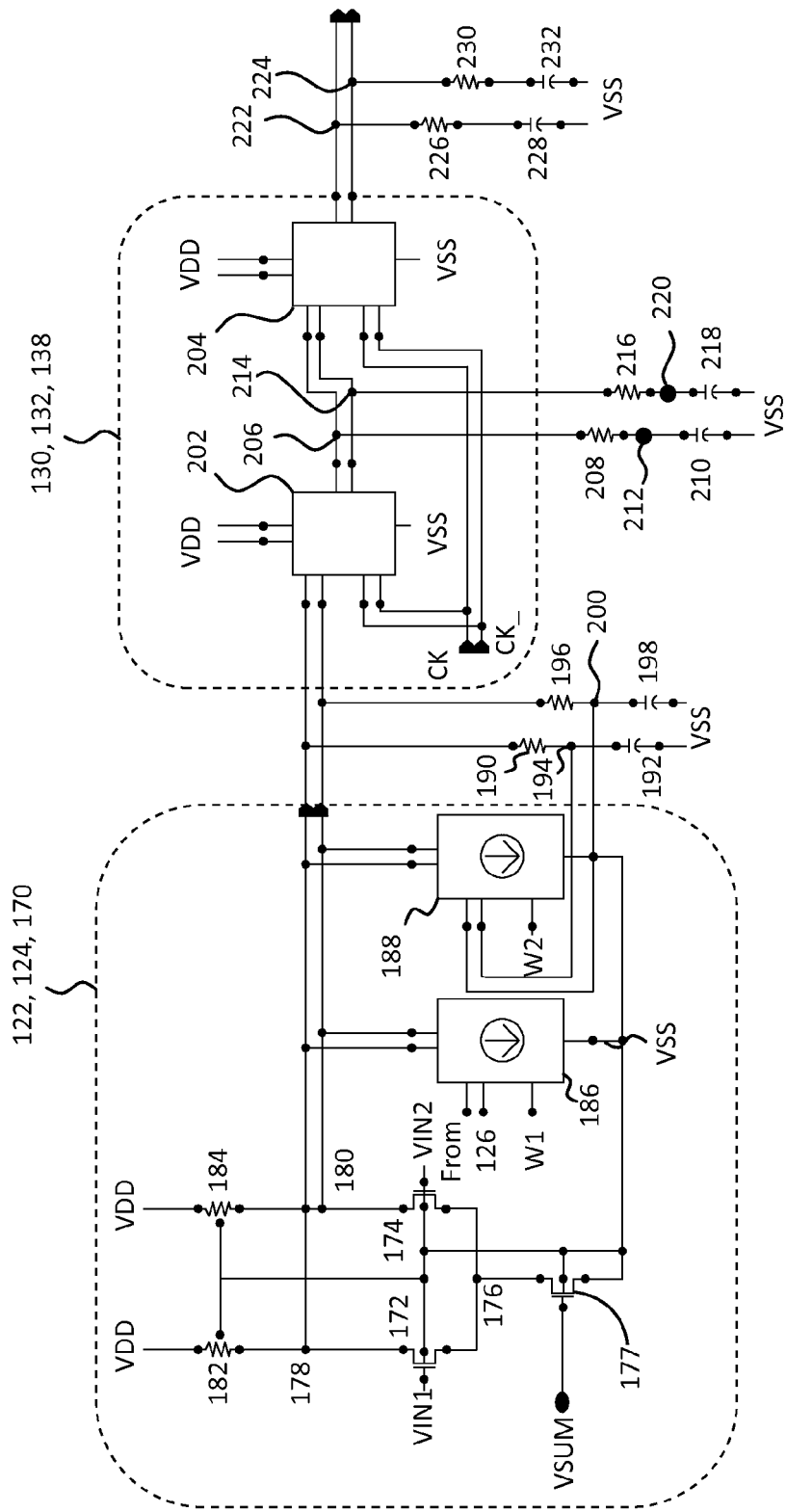
FIGS. 4A and 4B are block diagrams of examples of summation circuits of decision feedback equalizers in accordance with some embodiments.
Figure 4B:
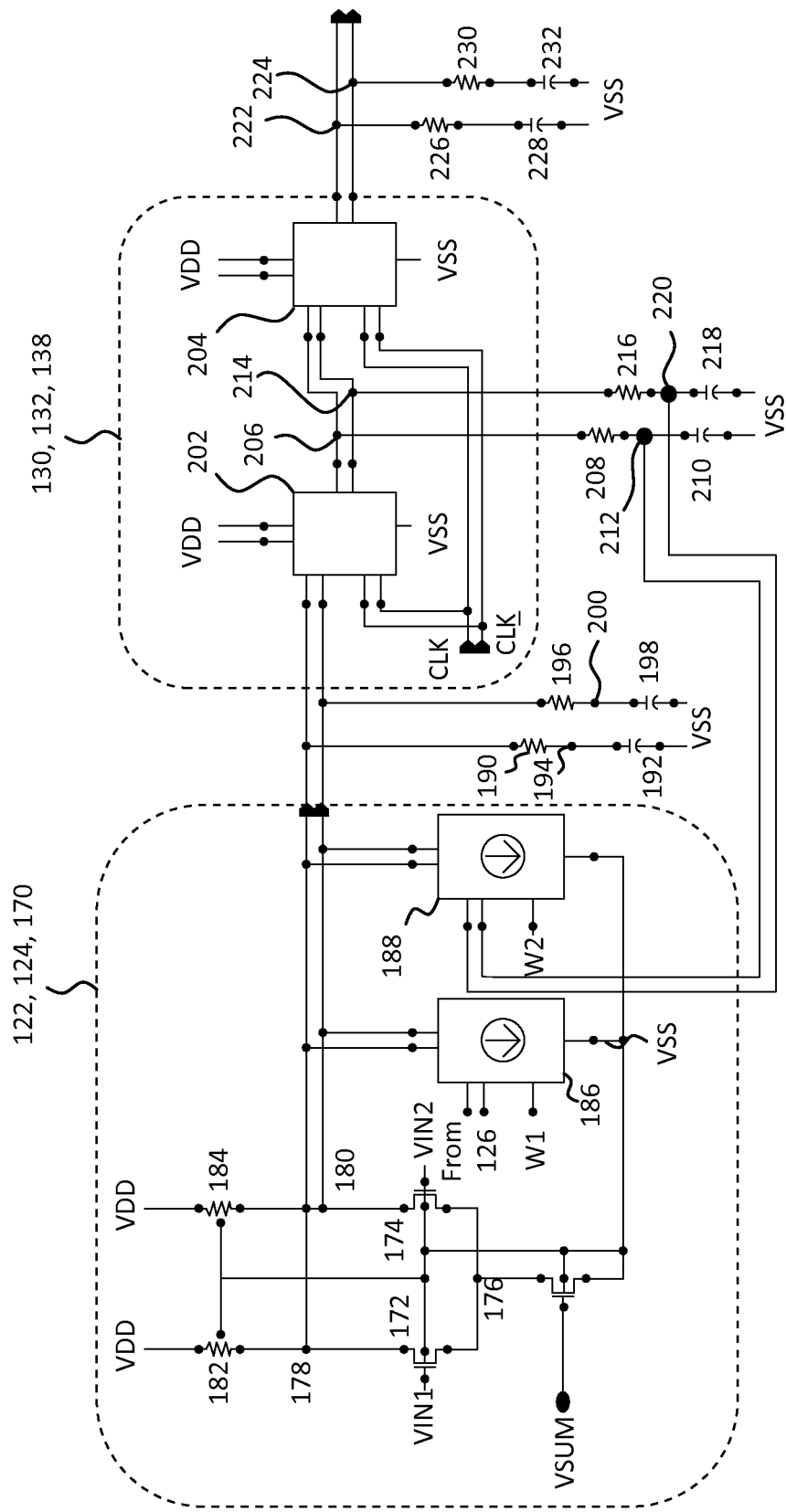

FIGS. 4A and 4B provide more detailed views of summation circuits 122, 124, 170 and their connections to FFs 130, 132, 138. Referring first to FIG. 4A, summation circuits 122, 124, 170 includes a pair of differential inputs, VIN1, VIN2, at the respective inputs of first and second transistors 172, 174, which have their sources coupled together at node 176. The drain of transistor 172 is coupled to node 178, and the drain of transistor 174 is coupled to node 180. Node 178 is coupled to resistor 182, and node 180 is coupled to resistor 184. Resistors 182 and 184 are coupled to a high voltage power supply such as VDD. Node 176 is coupled to the drain of transistor 177, which has its source coupled to a low voltage power supply, such as ground or VSS, and its gate coupled to receive a control signal VSUM. In some embodiments, VSUM is generated by a reference voltage block (not shown) for determining the biasing current of summation circuits 122, 124, 170.

Summation circuit 122, 124, 170 also includes a tap current source 186 and an offset calibration current source 188. Although a single tap current source 186 is shown, additional tap current sources may be implemented. Tap current source 186 includes a first input coupled to node 178, which is also coupled to CDR 108 (FIG. 1), and a second input coupled to node 180, which is also coupled to CDR 108 (FIG. 1). A plurality of additional inputs are coupled to receive previous bit signals, e.g., H1, H2, etc., from mux 126 and at least one weighting output from logic block 118, e.g., W1.

Offset calibration current source 188 also includes first and second inputs that respectively are coupled to nodes 178 and 180. Additional inputs of current source 188 are configured to receive a weighting signal from logic block 118, e.g., W2, and are coupled to the DC component of the output of summation circuit 122, 124. For example, nodes 178 and 180 serve as the output nodes of summer circuit 122, 124, 170 and are provided to flip-flop 130, 132, 138. In some embodiments, a pair of RC circuits are provided in parallel with each RC circuit being coupled to a respective one of nodes 178 and 180. For example, resistor 190 is coupled to node 178 and to capacitor 192 at node 194, which is coupled to an input of offset current source 188. Resistor 196 is coupled to node 180 and to capacitor 198 at node 200, which is coupled to another input of offset current source 188.

FF 130, 132, 138 includes a pair of latches 202, 204 that receive differential clock signals CK and CK_, which may be equal to CLK2 or (CLK2)b. Latch 202 includes a pair of inputs that are respectively coupled to node 178 and 180. The outputs of latch 202 are each respectively coupled to an RC circuit. For example, one output of latch 202 is coupled to node 206, which is coupled to resistor 208. At node 212, resistor 208 is coupled to a capacitor 210 that is also coupled to a low voltage power supply, such as ground or VSS. Another output of latch 202 is coupled to node 214, which is coupled to resistor 216. Resistor 216 is coupled to capacitor 218 at node 220, and capacitor 218 is coupled to the low voltage power supply.

The inputs of latch 204 are respectively coupled to nodes 206 and 214. The outputs of latch 204 are respectively coupled to nodes 222 and 224, which are respectively coupled to RC circuits. Node 222 is coupled to resistor 226, which is coupled to capacitor 228 that is also coupled to the low voltage power supply. Node 224, is coupled to resistor 230, which is coupled to capacitor 232 that is coupled to low voltage power supply.

The inputs of offset calibration current source 188 can be coupled to internal nodes of FF 130, 132 instead of to nodes 194 and 200. For example and as illustrated in FIG. 4B, current source 188 includes inputs coupled to nodes 212 and 220, which are coupled to internal nodes 206 and 214 of FF 130, 132.

Figure 5:
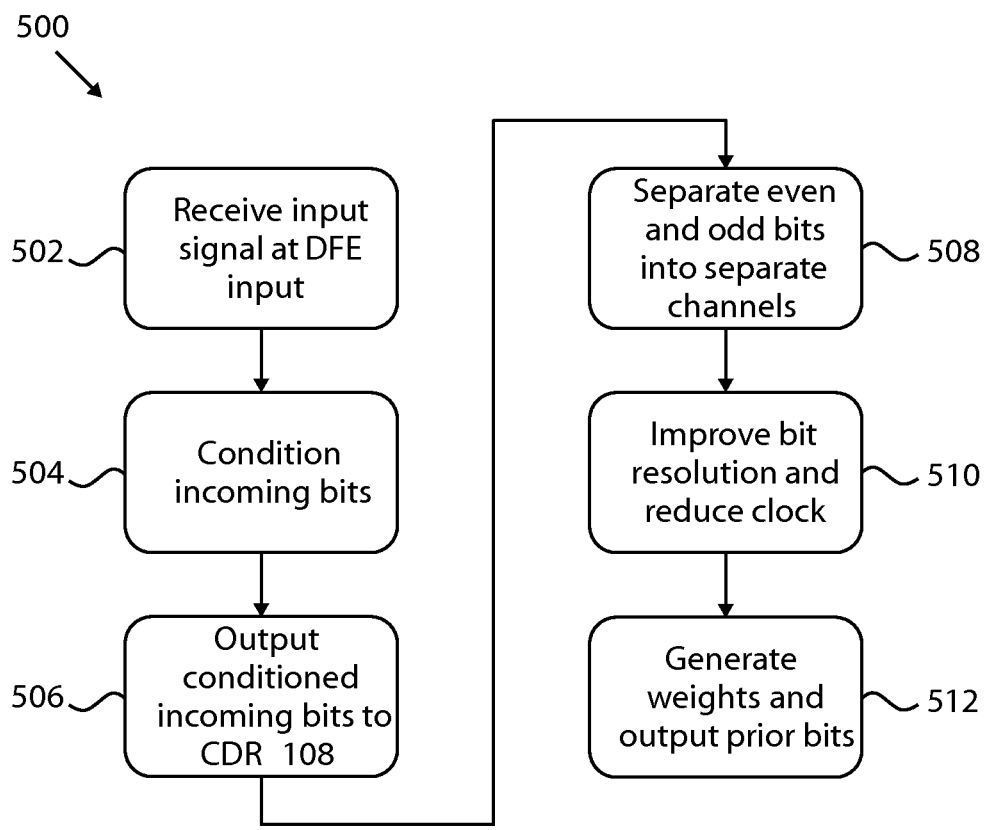
FIG. 5 is a flow diagram of one example of a method of operation of a decision feedback equalizer in accordance with some embodiments.

The operation of DFEs 110-1, 110-2 (collectively "DFEs 110") are described with reference to FIG. 5, which is a flow diagram of one example of a method of operation of DFEs 110. At block 502, an input signal is received at node 120. In some embodiments, the input signal is a differential input signal received from PGA 106. As described above, node 120 is coupled to summation circuits 122 and 124 of DFE 110-1 and to summation circuits 122, 124, and 170 of DFE 110-2. As best seen in FIGS. 4A and 4B, the components of the differential input signal, i.e., VIN1 and VIN2, are respectively received at the gate of transistors 172 and 174.

At block 504, the incoming bits are conditioned at summation blocks 122, 124 of DFE 110-1 and at summation blocks 122, 124, and 170 of DFE 110-2 to provide a conditioned input signal. Summation blocks 122, 124, 170, which are illustrated in FIGS. 4A and 4B, receive the previous bits at tap current source 186 and the incoming bits at the gates of transistors 172 and 174 and adds the values together as the current provided by current sources 186 and 188 are adjusted based on the feedback signals and the current at nodes 178 and 180 are adjusted based on the logical values of VIN1 and VIN2. The conditioned input data signal includes bit values that are more identifiable than the bit values of the input signal received at node 120.

At block 506, DFEs 110 outputs the conditioned input data signal to CDR 108. For example, DFE 110-1 outputs data signals to CDR 108 from node 128, which is coupled to the output of summation circuit 122. DFE 110-2 outputs data signals to CDR 108 from node 128, which is coupled to the output of summation circuit 122, and from node 176, which is coupled to the output of summation circuit 170. Combining the previous bits with the incoming bits at block 504 improves the resolution of the incoming bit (i.e., the slope and transition of the bits from a logic one to a logic zero and vice versa is more defined), which enables the incoming bits to be output to CDR 108 at block 506 and thereby improve the processing performed by CDR 108.

Because of the length of signal processing channel 100, an ideal bit at the end of the channel has a long tail (i.e., a moderate or slow transition). Tap current source(s) 186 enlarge (widen) the eye of an eye diagram of the output of summation circuit 122, 124, 170 as the tail of the previous bit is minimized. Outputting the data to CDR 108 helps CDR 108 to output a clock waveform with less jitter so improve the bit error rate of receiver channel 100.

At block 508, the even and odd bits are separated into different processing channels. In FIG. 2, for example, the output of FF 130 is coupled to node 134, which is coupled to the inputs of FFs 136 and 138. FFs 136 and 138 receive clock signals based on the clock output from CDR 108, but that are offset from one another such that when FF 136 outputting a bit FF 138 is storing a different bit. In this manner, FF 136 processes the odd bits and FF 138 processes the even bits.

In FIG. 3, summation circuits 128 and 170 are coupled to input node 120. The output of summation circuit 128 is coupled to FF 130, which operates at clock signal CLK2, and the output of summation circuit 170 is coupled to FF 138, which operates at an offset clock signal of (CLK2)b. With FFs 130 and 138 operating at offset clock signals, the even data bits (or odd data bits) are received at FF 130 and the odd data bits (or even data bits) are received at FF 138. Separately processing the even and odd bits of the incoming signal enables the clock speed to be reduced thereby reducing power consumed by DFEs 110.

At block 510, the bit resolution is improved and the frequency of the clock signal is reduced. For example and referring first to FIG. 2, FFs 136 and 138 respectively output signals to latches 146 and 152 that are respectively coupled to latches 148 and 154. In FIG. 3, FF 130 outputs the even bits to latch 146 through buffer 172, and FF 138 outputs the odd bits to latch 152 through buffer 178. Latches 146 and 148 improve the signal quality (i.e., improves the slope and transition between logic one and logic zero bits and vice versa) of even data bits output from FF 136, and latches 152 and 154 improve the signal quality of odd data bits output from FF 138.

Latch 148 operates at a frequency of CLK2 and outputs the even data bits to demux 150, which operates at a frequency of CLK4. In the parallel channel, latch 154 operates at the same frequency with an offset, i.e., (CLK2)b, and outputs the odd data bits to demux 156, which operates at a frequency of CLK4. Demuxes 150 and 156 enable the operating frequency to be further reduced from CLK2.

At block 512, error weights are generated and prior bits are output. As illustrated in FIGS. 2 and 3, DFE logic block 118 receives error signals from demux 144, even data bits from demux 150, and odd data bits from demux 156. In response to the inputs from demuxes 144, 150, and 156, DFE logic 118 outputs weights to summation circuits 122 and 124 and signals to mux 126 for providing the prior bits to summation circuits 122 and 124.

The circuits and methods described above advantageously reduce the number of components of a decision feedback amplifier of a receiving processing channel. Additionally, the disclosed circuits and methods output received data bits from the decision feedback amplifier to a clock and data recovery circuit, which improves the performance of the clock and data recovery circuit.

In some embodiments, a circuit includes a summation circuit for receiving an input data signal and a feedback signal including a previous data bit. The summation circuit is configured to output a conditioned input data signal to a clock and data recovery circuit. A first flip-flop is coupled to an output of the summation circuit and is configured to receive a first set of bits of the conditioned input data signal and a first clock signal having a frequency that is less than a frequency at which the input data signal is received by the first summation circuit. A second flip-flop is coupled to the output of the summation circuit and is configured to receive a second set of bits of the conditioned input data signal and a second clock signal having a frequency that is less than the frequency at which the input data signal is received by the first summation circuit.

In some embodiments, a method includes receiving an input data signal at an input of a decision feedback equalizer, conditioning bits of the input data signal by at least one summation circuit, and outputting the conditioned bits to a clock and data recovery circuit. The bit resolution of the conditioned bits are improved, error weights are generated at logic circuitry, and the error weights and a previous data bit are fed back to the at least one summation circuit.

In some embodiments, a first summation circuit is configured to receive an input data signal and a feedback signal including a previous data bit. The first summation circuit is configured to output a first conditioned input data signal to a clock and data recovery circuit. The first conditioned input data signal includes a first set of bits of the input data signal. A second summation circuit is configured to receive the input data signal the feedback signal including the previous data bit. The second summation circuit is configured to output a second conditioned input data signal to the clock and data recovery circuit. The second conditioned input data signal includes a second set of bits of the input data signal. A first flip-flop is coupled to an output of the first summation circuit and is configured to receive the first conditioned input data signal in response to a first clock signal having a frequency that is less than a frequency of the input data signal. A second flip-flop is coupled to the output of the second summation circuit and is configured to receive the second conditioned input data signal in response to a second clock signal having a frequency that is less than the frequency of the input data signal.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A summation circuit, comprising:
a first current source including at least one first input for receiving a signal based on an input data signal and at least one second input for receiving at least a first feedback signal with a first weighting value; and
a second current source having at least one third input for receiving the signal based on the input data signal, at least one fourth input for receiving an offset calibration signal that is provided by an RC circuit coupled to an output of the summation circuit, and at least one fifth input for receiving at least a second feedback signal with a second weighting value, wherein the RC circuit includes a resistor and a capacitor each directly coupled to the fourth input,
wherein the summation circuit is configured to output at least one output signal based on the input data signal and the first and second feedback signals, and wherein the second weighting value is an updated version of the first weighting value until the at least one output signal converges to a pre-defined signal level.

2. The summation circuit of claim 1, wherein the input data signal is a differential signal including first and second complementary signals.

3. The summation circuit of claim 1, wherein the offset calibration signal is a DC offset signal.

4. The summation circuit of claim 2, further comprising:
a first transistor having a gate configured to receive the first complementary signal, a source coupled to a first node, and a drain coupled to the at least one first input of the first current source at a second node; and
a second transistor having a gate configured to receive the second complementary signal, a source coupled to the first node, and a drain coupled to the at least third first input of the first current source at a third node.

5. The summation circuit of claim 4, further comprising:
a first resistor coupled to the drain of the first transistor and to the at least one first input of the first current source at the second node; and
a second resistor coupled to the drain of the second transistor and to the at least one third input of the second current source at the third node.

6. The summation circuit of claim 4, further comprising a third transistor having a drain coupled to the first node, a source coupled to a first power supply, and a gate configured to receive a reference voltage.

7. A circuit, comprising:
a first transistor having a gate configured to receive a first signal of a differential input signal pair, a source coupled to a first node, and a drain coupled to a first output node;
a second transistor having a gate configured to receive a second signal of a differential input signal pair, a source coupled to the first node, and a drain coupled to a second output node;
a first current source circuit including:
a first input coupled to the first output node,
a second input coupled to the second output node, and
a third input configured to receive at least a first feedback signal with a first weighting value; and
a second current source circuit including:
a first input coupled to the first output node,
a second input coupled to the second output node,
a third input configured to receive an offset calibration signal that is provided by a first RC circuit coupled to the first output node, wherein the RC circuit includes a resistor and a capacitor each directly coupled to the third input, and
at least one fourth input for receiving at least a second feedback signal with a second weighting value,
wherein the circuit is configured to output at least one output signal based on the differential input signal pair and the first and second feedback signals, and wherein the second weighting value is an updated version of the first weighting value until the at least one output signal converges to a pre-defined signal level.

8. The circuit of claim 7, further comprising
a first resistor coupled to the drain of the first transistor and to the at least one first input of the first current source at the first output node; and
a second resistor coupled to the drain of the second transistor and to the at least one third input of the second current source at the second output node.

9. The circuit of claim 7, further comprising a third transistor having a drain coupled to the first node, a source coupled to a first power supply, and a gate configured to receive a reference voltage.

10. The circuit of claim 7, wherein the offset calibration signal is a DC offset signal.

11. The circuit of claim 7, wherein the first and second output nodes are coupled respectively to a first input node of a flip-flop and to a second input node of the flip-flop.

12. The circuit of claim 11, further comprising:
a second RC circuit coupled to the second output node.

13. The circuit of claim 11, wherein the at least one feedback signal is received from an internal node of the flip-flop.

14. The circuit of claim 11, further comprising:
a first RC circuit coupled to a first internal node of the flip-flop; and
a second RC circuit coupled to a second internal node of the flip-flop.

15. The circuit of claim 12, wherein the first RC circuit includes:
   a first resistor coupled between the first output node and a second node, and
   a first capacitor coupled to the second node and to the first voltage supply.

16. The circuit of claim 14, wherein the first RC circuit includes
   a first resistor coupled to the first internal node of the flip-flop and to a second node that is coupled to the first current source; and
   a first capacitor coupled between the second node and the first power supply.

17. The circuit of claim 15, wherein the second RC circuit includes:
   a second resistor coupled between the second output node and a third node, and
   a second capacitor coupled to the third node and to the first voltage supply.

18. The circuit of claim 16, wherein the second RC circuit includes
   a second resistor coupled to the second internal node of the flip-flop and to a third node that is coupled to the first current source; and
   a second capacitor coupled between the third node and the first power supply.

* * * * *